(12) United States Patent
Manthe et al.

(10) Patent No.: US 9,132,502 B2
(45) Date of Patent: Sep. 15, 2015

(54) CONSUMABLE SELECTION AID FOR A PLASMA CUTTING SYSTEM

(71) Applicant: ILLINOIS TOOL WORKS INC., Glenview, IL (US)

(72) Inventors: Alan A. Manthe, Hortonville, WI (US); David Paul Marcusen, Hortonville, WI (US); Steven D. Hidden, Appleton, WI (US); Ashok Darisipudi, Aurora, IL (US); Brian Mitchell Brown, Appleton, WI (US); Jon M. Huhn, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/557,086

(22) Filed: Dec. 1, 2014

(65) Prior Publication Data

US 2015/0083696 A1     Mar. 26, 2015

Related U.S. Application Data

(63) Continuation of application No. 13/396,190, filed on Feb. 14, 2012, now Pat. No. 8,901,450.

(51) Int. Cl.
*B23K 10/00* (2006.01)
*F22B 1/28* (2006.01)

(52) U.S. Cl.
CPC ............ *B23K 10/006* (2013.01); *B23K 10/00* (2013.01); *F22B 1/281* (2013.01)

(58) Field of Classification Search
CPC ...... F22B 1/281; B23K 1/0956; B23K 9/124; H05H 1/26

USPC ............ 219/121.45, 121.54, 121.57, 130.1, 219/130.31, 130.32, 137 R
See application file for complete search history.

(56) References Cited

U.S. PATENT DOCUMENTS

| | | | |
|---|---|---|---|
| 4,131,805 A | | 12/1978 | Austin |
| 4,815,983 A | * | 3/1989 | Erickson et al. ............. 439/173 |
| 5,343,016 A | * | 8/1994 | Davis et al. ................. 219/130.4 |
| 6,002,103 A | * | 12/1999 | Thommes ................ 219/130.21 |
| 8,901,450 B2 | * | 12/2014 | Manthe et al. ........... 219/121.39 |
| 2002/0190042 A1 | | 12/2002 | Gadamus |
| 2009/0071949 A1 | * | 3/2009 | Harris ........................ 219/130.1 |
| 2009/0277881 A1 | | 11/2009 | Bornemann |
| 2010/0012635 A1 | * | 1/2010 | Wierschke et al. ........ 219/130.1 |
| 2012/0037609 A1 | * | 2/2012 | Gaudiosi et al. .............. 219/383 |

OTHER PUBLICATIONS

Thermal Dynamics Cutmaster Plasma Cutting System Operating Manual, Rev. AC, Aug. 26, 2011, Manual #0-5141.
PCT International Search Report for PCT Application No. PCT/US2013/025678 mailed May 28, 2013, 11 pgs.

* cited by examiner

*Primary Examiner* — Mark Paschall
(74) *Attorney, Agent, or Firm* — Fletcher Yoder, P.C.

(57) ABSTRACT

A plasma cutting or welding system includes a power input. The power input is configured to be coupled to a plurality of multipronged input plugs. Each of the multipronged input plugs corresponds to an input voltage. The power supply also includes a user input device for selecting an operating current. The user input device is subdivided into a plurality of current ranges. Each of the current ranges includes an iconic representation of at least one multipronged input plug.

20 Claims, 5 Drawing Sheets

US 9,132,502 B2

CONSUMABLE SELECTION AID FOR A PLASMA CUTTING SYSTEM

CROSS REFERENCE TO RELATED APPLICATION

This application is a Continuation patent application from U.S. patent application Ser. No. 13/396,190, entitled "Consumable Selection Aid for a Plasma Cutting System", filed Feb. 14, 2012, which is herein incorporated by reference in its entirety for all purposes.

BACKGROUND

The invention relates generally to plasma cutting systems and, more particularly, to a consumable selection aid for a plasma cutting system.

A plasma cutting system harnesses the energy in plasma (e.g., high temperature ionized gas) to cut metal or other electrically conductive material. A plasma arc is struck between components in the plasma cutting torch and the work piece. This process creates a voltage output between the cutting torch and the workpiece. Accordingly, a power supply unit coupled to a torch and a work lead is an integral part of a plasma cutting system. The plasma cutting system may receive power from power sources with voltage and current characteristics that vary. For example, a power source that provides power to the plasma cutting system may provide 120 volts and 15 amps, 120 volts and 20 amps, 240 volts and 30 amps, 240 volts and 50 amps, and so forth. The type of power source coupled to the plasma cutting system provides limitations to a plasma cutting operation. As such, it may be difficult for an operator to determine the appropriate current settings for a particular plasma cutting operation based on which type of power source the plasma cutting system is connected to. Further, as will be appreciated, a variety of consumables may be used for plasma cutting. In certain configurations, the appropriate type of consumable may depend on an operating current. Unfortunately, determining the proper type of consumables to use for a particular plasma cutting system configuration may not be easily ascertainable. Accordingly, there is a need in the field for a plasma cutting system that overcomes such deficiencies.

BRIEF DESCRIPTION

In one embodiment, a plasma cutting system having a plurality of multipronged input plugs configured to correspond to an input voltage and a maximum current. The plasma cutting system includes a user input device for selecting an operating current. The user input device is subdivided into a plurality of current ranges. Each of the current ranges includes an iconic representation of at least one multipronged input plug. The plasma cutting system includes indicia representing one of a plurality of torch tips. The indicia correlates the plurality of torch tips with each iconic representation of the at least one multipronged input plug.

In another embodiment, a method for controlling current provided by a plasma cutting system includes detecting a supply voltage received through a selected multipronged input plug of a plurality of multipronged input plugs. The method also includes receiving a user selected input from a user device to set an operating current of the plasma cutting system. The user device is subdivided into a plurality of current ranges. Each of the current ranges includes an iconic representation of at least one multipronged input plug. The method includes limiting the operating current to a maximum current within the operating current range if the user selected input from the user device is not within an operating current range of the selected multipronged input plug.

In another embodiment, a plasma cutting or welding system includes a power input configured to be coupled to a plurality of multipronged input plugs. Each of the multipronged input plugs corresponds to an input voltage. The power supply also includes a user input device for selecting an operating current. The user input device is subdivided into a plurality of current ranges. Each of the current ranges includes an iconic representation of at least one multipronged input plug.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
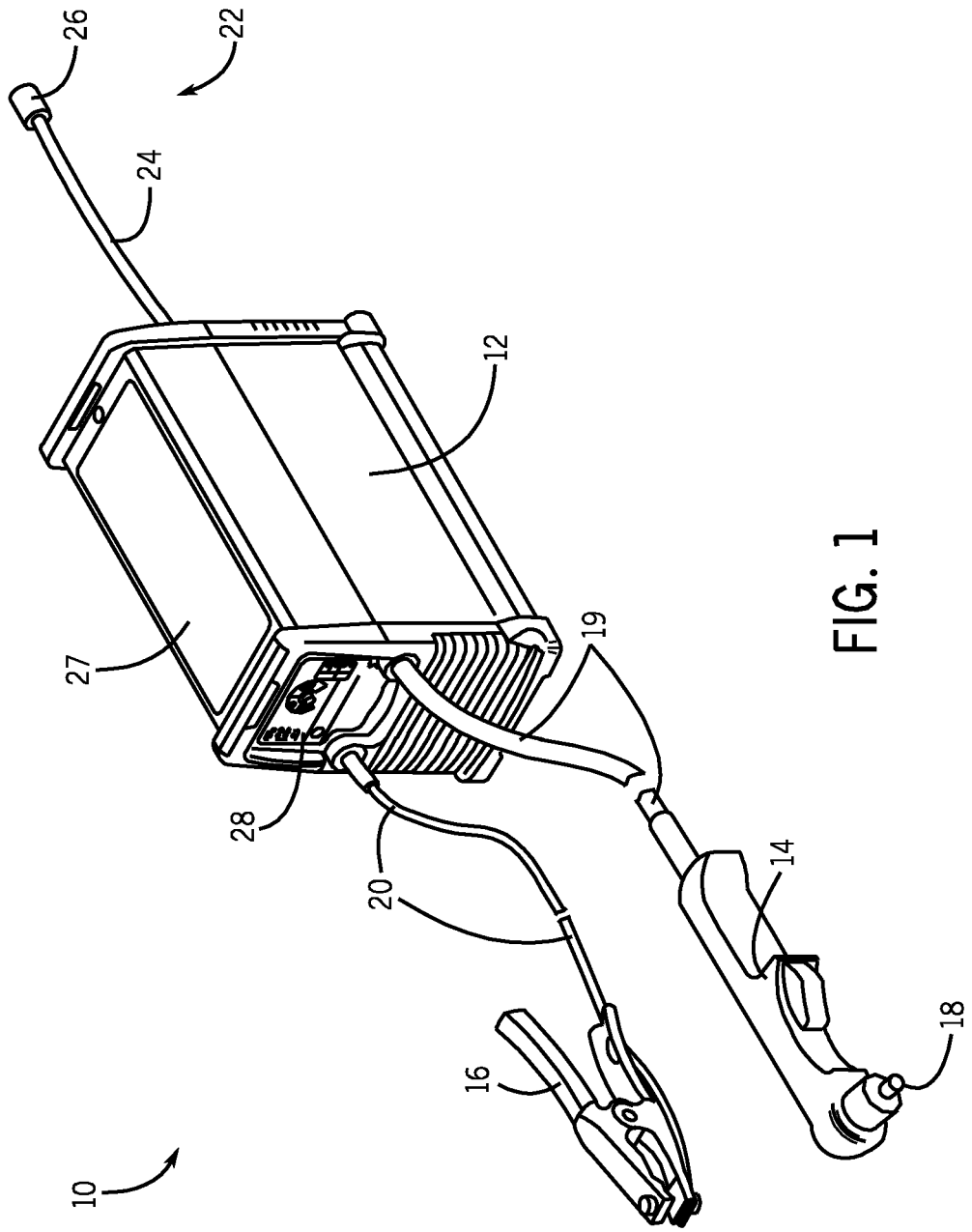
FIG. 1 is a perspective view of an embodiment of a plasma cutting system in accordance with aspects of the present disclosure.

Referring now to the drawings, FIG. 1 is a perspective view illustrating an embodiment of a plasma cutting system 10. The illustrated plasma cutting system 10 includes a power supply 12 coupled to a torch 14 and a work piece clamp 16. The torch 14 includes a tip 18 having a consumable used during a plasma cutting operation. As will be appreciated, the type of tip 18 may vary based on the operating current of the power supply 12. For example, one tip 18 may be rated for operating at currents up to 30 amps, while another tip 18 may be rated for operating at currents up to 40 amps. Use of the wrong tip 18 may result in poor cutting quality or premature degradation of the tip 18.

The torch 14 is electrically coupled to the power supply 12 via a cable 19. Further, the work piece clamp 16 is electrically coupled to the power supply 12 via a cable 20. The power supply 12 is electrically coupled to a power source (e.g., a power grid or a motor-driven generator) via a power cable assembly 22. The power source provides a current to the torch 14 for starting and generating a pilot arc, and for maintaining plasma and a cutting arc. For example, the power supply 12 supplies a suitable voltage and current to create an electrical circuit from the power supply 12, along the cable 19 to the torch 14, across a gap between the torch 14 and a work piece (e.g., as an electrical arc), through the work piece to the clamp 16, and through the cable 20 back to the power supply 12.

The power cable assembly 22 includes a cable 24 coupled to a connector 26. As explained below in relation to FIGS. 4-7, the connector 26 of the power cable assembly 22 may include one of a variety of multipronged plug configurations that may be used to connect the connector 26 to different types of power sources. As such, the power supply 12 may include multiple power cable assemblies 22 with each power cable assembly 22 having a unique multipronged plug configuration. Each of the multipronged input plugs may correspond to an output voltage and/or maximum output current of a particular power source.

The power supply 12 includes an enclosure 27 defining a generally closed volume to support various circuits, sensor features, control features, and gas supply features (e.g., air compressor). For example, the power supply 12 may include sensors and controls to adjust the power supply 12 to account for various conditions, e.g., altitude, temperature, pressure, and so forth. The enclosure 27 may also include vents to relieve heat and/or pressure inside the power supply 12.

In the illustrated power supply 12, a control panel 28 is included on the front of the power supply 12. The control panel 28 may include various control inputs, indicators, displays, electrical outputs, air outputs, and so forth. In certain embodiments, the control panel 28 may include a button, knob, switch, or touch screen configured to enable selection of a mode of operation (e.g., plasma cut, gouge, etc.), power on/off, an output current level, gas (e.g., air) flow rate, gas (e.g., air) pressure, gas type, a work piece type, a control type (e.g., manual or automatic feedback control), or a combination thereof. The control panel 28 may also include various indicators to provide feedback to the user. For example, the indicators may include one or more light emitting diodes (LED) and/or liquid crystal displays (LCD) to display on/off status, current level, voltage level, gas (e.g., air) pressure, gas (e.g., air) flow, environmental conditions (e.g., altitude, temperature, pressure, etc.), or any other parameter. Additionally, the indicators may include an LED or LCD that displays a trouble or warning indicator if there is a problem with the power supply 12.

Embodiments of the control panel 28 may include any number inputs and outputs, such as welding methods, air compressor settings, oil pressure, oil temperature, and system power. Further, the user inputs and indicators may be electrically coupled to control circuitry and enable a user to set and monitor various parameters of the power supply 12. For example, the indicators may display environmental conditions (e.g., altitude, temperature, pressure, etc.) that prompt a user to manually adjust the current, voltage, gas flow rate, gas pressure, or other operational parameters, or a combination thereof.

As described in detail below, the control panel 28 may include a correlation between graphical representations of multipronged input plugs, and an operating current range and/or a tip 18. As such, an operator may easily determine the appropriate operating current and/or tip 18 based a graphic on the surface of the power supply 12 that looks like the end of the connector 26 (e.g., multipronged plug) that connects the power supply 12 to the power source.

Figure 2:
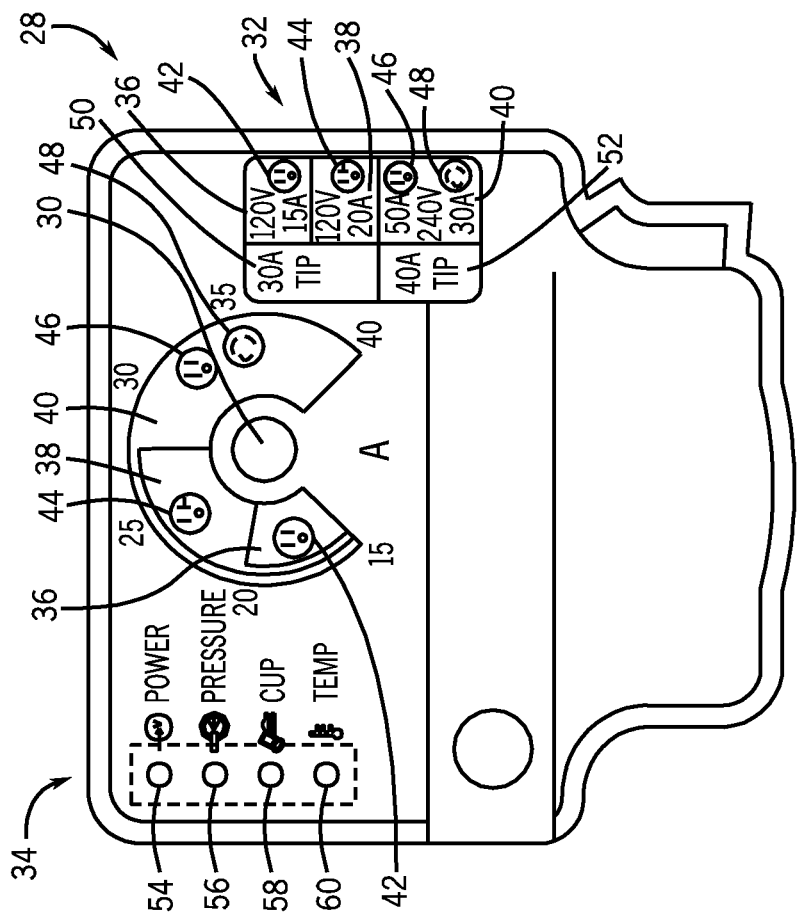
FIG. 2 is a front view of an embodiment of a control panel for a plasma cutting system in accordance with aspects of the present disclosure.

FIG. 2 is a front view of an embodiment of the control panel 28 for the plasma cutting system 10. The control panel 28 includes a user input device 30 (e.g., knob, dial, touch screen, etc.) for adjusting the output current setting (e.g., operating current) of the power supply 12. The control panel 28 also includes indicia 32 to aid an operator in determining an appropriate tip 18 and output current setting based on the appearance of the end of the connector 26 that connects the power supply 12 to the power source. Further, the control panel 28 includes indicators 34 that provide feedback to the operator about conditions of the power supply 12, plasma cutting system 10, and/or environmental factors.

The user input device 30 may be used to adjust the output current setting of the power supply 12 within a variety of current ranges. For example, the output current settings may be divided into a first range 36, a second range 38, and a third range 40. As will be appreciated, the first range 36, the second range 38, and the third range 40 may include overlapping positions. In certain embodiments, the first range 36 may include current settings between 15 and 20 amps, the second range 38 may include current settings between 15 and 27 amps, and the third range 40 may include current settings between 15 and 40 amps. However, as may be appreciated, the first range 36, the second range 38, and the third range 40 may include current settings that vary between any suitable values. Various graphical indicators or indicia may be used on the control panel 28 to assist an operator in determining which range or ranges the user input device 30 is set within. For example, the control panel 28 may include color coded regions, divider lines, text, etc.

Further, a graphical or iconic representation of one or more multipronged input plugs (e.g., based on National Electrical Manufacturers Association (NEMA) standards) may be included within the ranges 36, 38, and 40 to show which multipronged input plugs correspond to a particular one of the ranges 36, 38, and 40. For example, a representation of a first multipronged input plug configuration 42 (e.g., NEMA 5-15) is illustrated as corresponding to the first range 36. Further, a representation of a second multipronged input plug configuration 44 (e.g., NEMA 5-20) is illustrated as corresponding to the second range 38. In addition, a representation of a third multipronged input plug configuration 46 (e.g., NEMA 5-50) and a representation of a fourth multipronged input plug configuration 48 (e.g., NEMA L6-30) are both illustrated as corresponding to the third range 40. As will be appreciated, any type of representation may be used to represent a particular multipronged input plug configuration. For example, the representation may be graphical, iconic, symbolic, text, NEMA names, pictures, videos, color coding, letter coding, etc. As will be appreciated, the representations of the multipronged input plug configuration provide a visual representation to a user of the plasma cutting system 10 so that the user can determine a correct operating range 36, 38, or 40 merely by comparing the representation of the multipronged input plug configuration to the plug configuration of the connector 26 (e.g., or adaptor) that connects to the power source.

The indicia 32 may include a table like configuration as illustrated. As such, different types of tips 18 may be correlated with one or more of the ranges 36, 38, and 40 and/or the representations of the multipronged input plug configurations 42, 44, 46, and 48. For example, a first tip 50 (e.g., a tip rated for operation up to 30 amps) may correspond to the ranges 36 and 38 and to the representation of the multipronged input plug configurations 42 and 44. Further, a second tip 52 (e.g., a tip rated for operation up to 40 amps) may correspond to the range 40 and to the representation of the multipronged input plug configurations 46 and 48. In other embodiments, any type of tip may correspond to a suitable operating current range and/or representation of a multipronged input plug configuration. The indicia 32 that correlates the tips 18 with the ranges 36, 38, and 40 and/or the representations of the multipronged input plug configurations 42, 44, 46, and 48 may be any suitable indicia. For example, the indicia 32 may be graphical, iconic, symbolic, text, pictures, videos, color coding, letter coding, etc. As will be appreciated, the indicia 32 provide visual indications to a user of the plasma cutting system 10 so that the user can determine a correct tip 18 merely by comparing the indicia 32 to a correctly set operating range 36, 38, or 40, and/or by comparing the indicia 32 to a representation of the multipronged input plug configuration that matches the plug configuration of the connector 26 (e.g., or adaptor) that connects to the power source. Thus, a correct tip 18 may be determined resulting in better plasma cutting and/or extended longevity of the tip 18.

As illustrated, the control panel 28 may also include the indicators 34. For example, the control panel 28 may include a power indicator 54, a pressure indicator 56, a cup indicator 58, and a temperature indicator 60. The power indicator 54 provides an indication that the power supply 12 is powered on. In certain embodiments, a flashing power indicator 54 may indicate a problem with the power being provided to the power supply 12. The pressure indicator 56 relates to pressure in the plasma cutting system 10, the cup indicator 58 relates to the status of a torch cup, and the temperature indicator 60 relates to the operating temperature of the plasma cutting system 10. Generally when the power indicator 54 is on, the pressure indicator 56, the cup indicator 58, and the temperature indicator 60 will be off, indicating normal system operation. If any of the indicators 56, 58, and 60 are on, or flashing, there may be a problem in the plasma cutting system 10.

Figure 3:
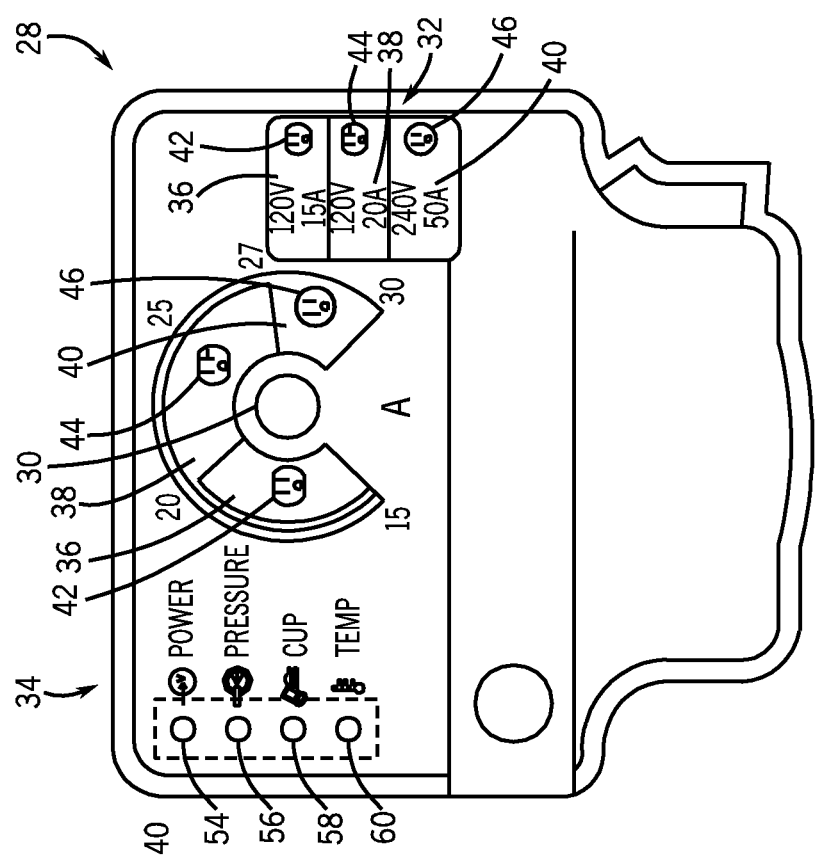
FIG. 3 is a front view of another embodiment of a control panel for a plasma cutting system in accordance with aspects of the present disclosure.

FIG. 3 is a front view of another embodiment of the control panel 28 for the plasma cutting system 10. In this embodiment, only one tip 18 is used for all current ranges of plasma cutting. Therefore, the indicia 32 does not include representations illustrating a correlation between a type of torch tip 18, and the ranges 36, 38, and 40 and/or the multipronged input plug configurations 42, 44, and 46. As illustrated, a representation of the first multipronged input plug configuration 42 is illustrated as corresponding to the first range 36. Further, a representation of the second multipronged input plug configuration 44 is illustrated as corresponding to the second range 38. In addition, a representation of the third multipronged input plug configuration 46 is illustrated as corresponding to the third range 40. As such, the representations of the multipronged input plug configuration provide a visual representation to a user of the plasma cutting system 10 so that the user can determine a correct operating range 36, 38, or 40 merely by comparing the representation of the multipronged input plug configuration to the plug configuration of the connector 26 (e.g., or adaptor) that connects to the power source.

Figure 4:
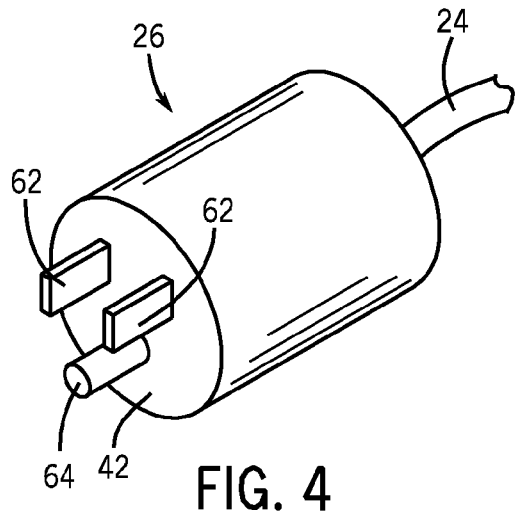
FIG. 4 is a perspective view of an embodiment of a power connector for the plasma cutting system of FIG. 1.

FIGS. 4-7 illustrate various embodiments of multipronged input plug configurations. These embodiments are examples of multipronged input plug configurations. It should be noted that any suitable plug configuration may be used with the plasma cutting system 10. Specifically, FIG. 4 is a perspective view of an embodiment the first multipronged input plug configuration 42 of the power connector 26 for the plasma cutting system 10 of FIG. 1. The plug configuration 42 includes two rectangular and generally vertical prongs 62 that are substantially the same size. The plug configuration 42 also includes a generally circular prong 64. As will be appreciated, the plug configuration 42 is generally used for connecting to a power source rated to provide 120 volts AC and 15 amps.

Figure 5:
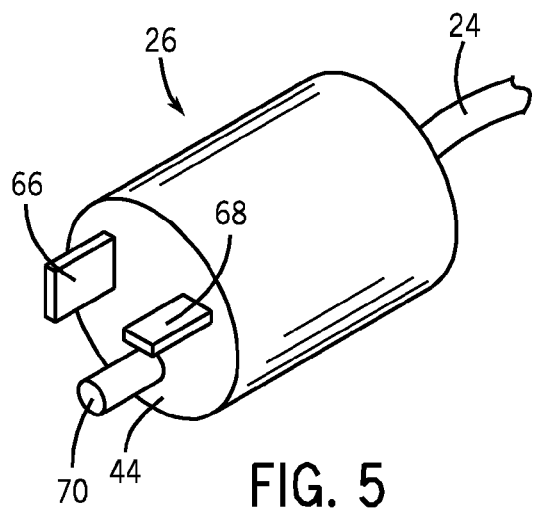
FIG. 5 is a perspective view of another embodiment of a power connector for the plasma cutting system of FIG. 1.

FIG. 5 is a perspective view of an embodiment the second multipronged input plug configuration 44 of the power connector 26 for the plasma cutting system 10 of FIG. 1. The plug configuration 44 includes a first rectangular prong 66 that is oriented in a generally vertical position, and a second rectangular prong 68 that is oriented in a generally horizontal position. The plug configuration 44 also includes a generally circular prong 70. As will be appreciated, the plug configuration 44 is generally used for connecting to a power source rated to provide 120 volts AC and 20 amps.

Figure 6:
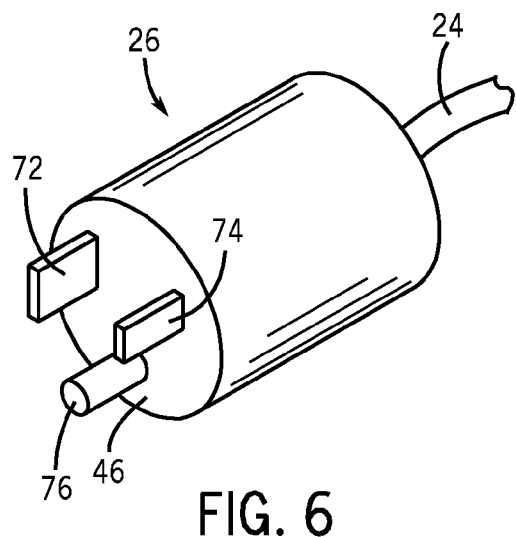
FIG. 6 is a perspective view of another embodiment of a power connector for the plasma cutting system of FIG. 1.

FIG. 6 is a perspective view of an embodiment the third multipronged input plug configuration 46 of the power connector 26 for the plasma cutting system 10 of FIG. 1. The plug configuration 46 includes a first rectangular prong 72 and a second rectangular prong 74, both of the prongs 72 and 74 are oriented in a generally horizontal position, however the prong 72 extends a greater vertical distance than the prong 74. The plug configuration 46 also includes a generally circular prong 76. As will be appreciated, the plug configuration 46 is generally used for connecting to a power source rated to provide 240 volts AC and 50 amps.

Figure 7:
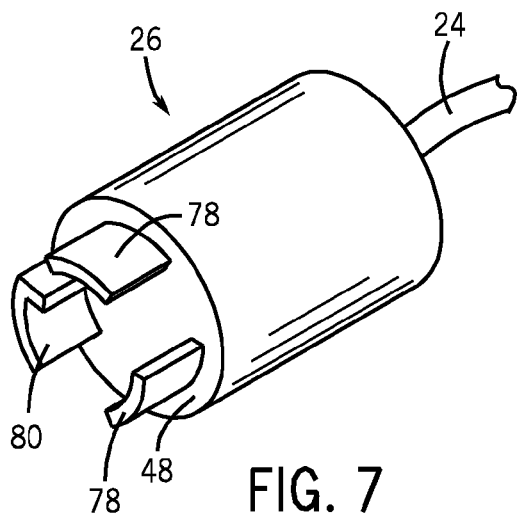
FIG. 7 is a perspective view of another embodiment of a power connector for the plasma cutting system of FIG. 1.

FIG. 7 is a perspective view of an embodiment the fourth multipronged input plug configuration 48 of the power connector 26 for the plasma cutting system 10 of FIG. 1. The plug configuration 48 includes semi-circular shaped prongs 78 that are substantially the same size. The plug configuration 48 also includes a keyed semi-circular shaped prong 80. As will be appreciated, the plug configuration 48 is generally used for connecting to a power source rated to provide 240 volts AC and 30 amps.

Figure 8:
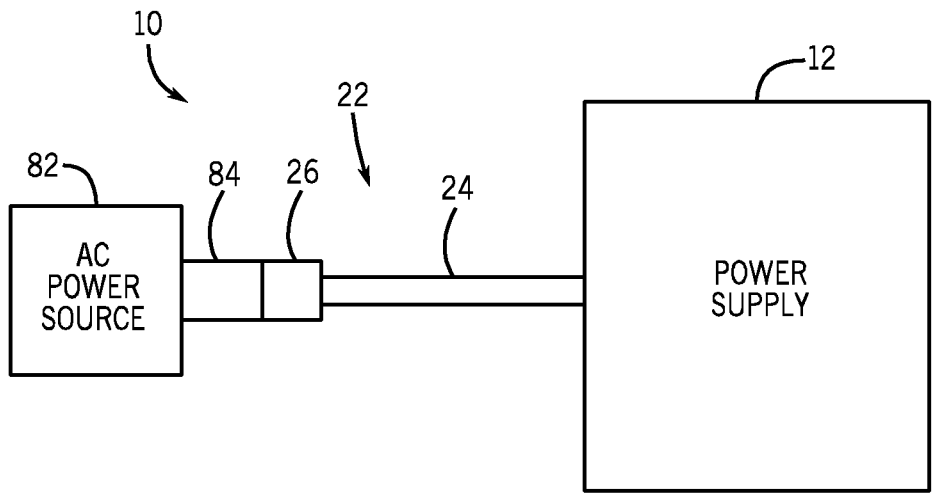
FIG. 8 is a block diagram of an embodiment of a plasma cutting system in accordance with aspects of the present disclosure.

FIG. 8 is a block diagram of an embodiment of the plasma cutting system 10. As illustrated, an AC power source 82 may provide power to the power supply 12. Specifically, the power cable assembly 22 may couple the power supply 12 to an adaptor 84. The adaptor 84 is coupled between the power cable assembly 22 and the AC power source 82. In such a configuration, the power cable assembly 22 may use a single connector 26 (having a single plug configuration) to connect to multiple types of AC power sources 82. For example, the connector 26 may have the plug configuration 42 as illustrated in FIG. 4. The adaptor 84 may have a receptacle to match the plug configuration 42 on one end, and on the other end the adaptor 84 may have any other plug configuration (e.g., plug configuration 44, 46, or 48). Such an adaptor may be an adaptor as described in U.S. application Ser. No. 12/183,516, entitled "POWER CORD SYSTEM FOR WELDING-TYPE DEVICES," filed Jul. 31, 2008, which is hereby incorporated by reference in its entirety.

Figure 9:
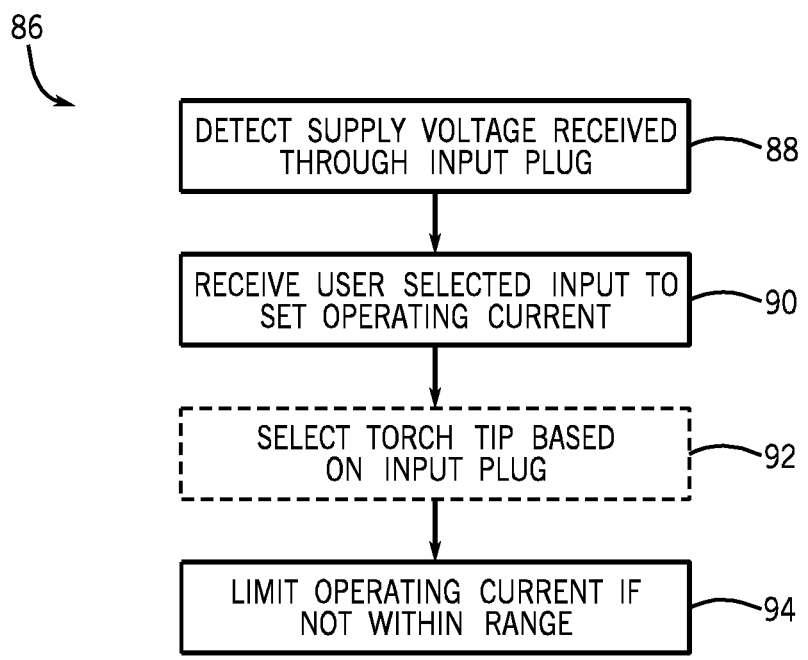
FIG. 9 is a flow chart of an embodiment of a method for controlling current provided by the plasma cutting system of FIG. 1 according to aspects of the present disclosure.

FIG. 9 is a flow chart of an embodiment of a method 86 for controlling current provided by the plasma cutting system 10 of FIG. 1. At block 88, the power supply 12 detects a supply voltage received through a selected multipronged input plug of the multipronged input plug configurations 42, 44, 46, and 48. Next, at block 90, the power supply 12 receives a user selected input from the user input device 30 to set the operating current of the plasma cutting system 10. As previously described, the user input device 30 is subdivided into the ranges 36, 38, and 40. Each of the ranges 36, 38, and 40 is correlated to an iconic representation of at least one of the multipronged input plug configurations 42, 44, 46, and 48. Further, each of the ranges 36, 38, and 40 may be correlated to one of the torch tips 50 and 52. In certain embodiments, a user may select one of the torch tips 50 and 52 based on the selected multipronged input plug configuration 42, 44, 46, or 48, per block 92. As will be appreciated, the user may select the torch tip 50 or 52 based on an iconic representation of the multipronged input plug configuration and/or other indicia. At block 94, control circuitry of the power supply 12 may limit the operating current of the plasma cutting system 10 to a maximum current within the applicable operating current range if the user selected input from the user input device 30 is not within an applicable operating current range of the selected multipronged input plug. In certain configurations, if a user sets the user selected input from the user input device 30 higher than the applicable operating current range of the selected multipronged input plug, the power supply 12 may attempt to use greater current than available and cause a circuit breaker to trip. Using such a method, the user can determine a correct operating range 36, 38, or 40 and/or tip 18 merely by comparing the representation of the multipronged input plug configuration to the plug configuration of the connector 26 (e.g., or adaptor) that connects to the power source. As will be appreciated, while the embodiments described herein have been discussed as being within the plasma cutting system 10, the embodiments may also be incorporated into welding systems, induction heating systems, generator systems, and so forth.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A plasma cutting or welding system comprising:
   a plurality of multipronged input plugs, wherein each of the multipronged input plugs is configured to correspond to a different input voltage or a different maximum current of a power source;
   a control panel comprising a user input device for selecting an operating current, the user input device being subdivided into a plurality of current ranges, wherein each of the current ranges comprises an iconic representation of at least one multipronged input plug; and
   control circuitry configured to limit an operating current of the plasma cutting or welding system based at least in part on the selected operating current and a voltage received through a selected multipronged input plug.

2. The system of claim 1, wherein the control panel comprises first indicia representing one of a plurality of torch tips, wherein the indicia correlates at least one of the plurality of torch tips with each iconic representation of the at least one multipronged input plug.

3. The system of claim 2, wherein the control panel comprises second indicia that correlates each of the multipronged input plugs with at least one of the plurality of current ranges.

4. The system of claim 2, wherein each of the plurality of torch tips is configured to operate within at least one of the plurality of current ranges.

5. The system of claim 1, wherein each of the multipronged input plugs comprises an adaptor having a first end configured to be coupled to a power source and a second end configured to direct power to the plasma cutting or welding system.

6. A method comprising:
   detecting a supply voltage received through a selected multipronged input plug of a plurality of multipronged input plugs, wherein each of the multipronged input plugs corresponds to a different input voltage of a power source;
   receiving a user selected input from a user device disposed on a control panel of a plasma cutting or welding system, the user device being subdivided into a plurality of current ranges, wherein each of the current ranges comprises an iconic representation of at least one multipronged input plug; and
   limiting an operating current of the plasma cutting or welding system based at least in part on the user selected input and a voltage received through the selected multipronged input plug.

7. The method of claim 6, wherein the iconic representation of the at least one multipronged input plug corresponds to one of a plurality of torch tips.

8. The method of claim 7, comprising selecting a torch tip from the plurality of torch tips based on the selected multipronged input plug.

9. The method of claim 7, comprising indicia of the plurality of torch tips that correlates the plurality of torch tips with an iconic representation of the at least one multipronged input plug.

10. The method of claim 9, comprising selecting a torch tip from the plurality of torch tips based on the indicia.

11. The method of claim 6, wherein the iconic representation indicates that the at least one multipronged input plug is configured to operate within the respective current range.

12. A plasma cutting or welding system comprising:
   a power input configured to be coupled to a plurality of multipronged input plugs, wherein each of the multipronged input plugs corresponds to a different input voltage of a power source;
   a control panel comprising a user input device for selecting an operating current, the user input device being subdivided into a plurality of current ranges, wherein each of the current ranges comprises an iconic representation of at least one multipronged input plug; and
   control circuitry configured to limit an operating current of the plasma cutting or welding system based at least in part on the selected operating current and a voltage received through a selected multipronged input plug.

13. The system of claim 12, comprising the plurality of multipronged input plugs, wherein each of the multipronged input plugs comprises an adaptor having a first end configured to be coupled to a power source and a second end configured to direct power to the power input.

14. The system of claim 12, wherein the iconic representation of the at least one multipronged input plug corresponds to one of a plurality of torch tips.

15. The system of claim 14, wherein each of the plurality of torch tips is configured to operate within at least one of the plurality of current ranges.

16. The system of claim 14, comprising indicia of the plurality of torch tips that correlates the plurality of torch tips with an iconic representation of the at least one multipronged input plug.

17. The system of claim 12, comprising a plasma cutting torch configured to use the operating current for plasma cutting.

18. The system of claim 12, comprising indicia that correlates each of the multipronged input plugs to at least one of the plurality of current ranges.

19. The system of claim 18, wherein the indicia correlates at least one of the multipronged input plugs to at least two current ranges, the at least two current ranges comprising overlapping color regions.

20. The system of claim 18, wherein the indicia comprises at least one of a graphic, an icon, a symbol, a picture, a video, a color, or text for each of the multipronged input plugs.

* * * * *